UNITED STATES PATENT OFFICE.

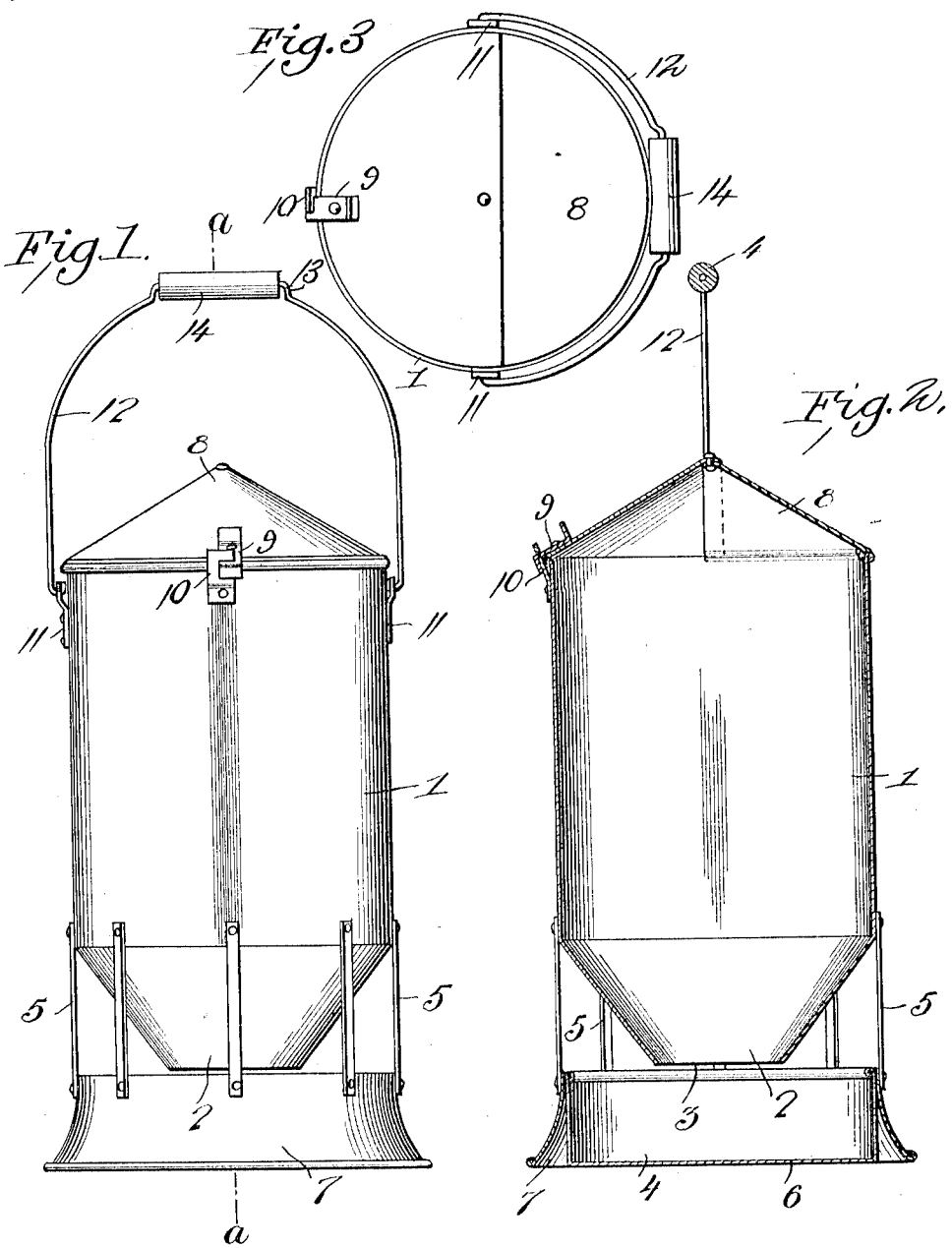

JOHN M. FRANKLIN, OF HATFIELD, PENNSYLVANIA.

POULTRY-FEED HOPPER.

1,079,231.  Specification of Letters Patent.  Patented Nov. 18, 1913.

Application filed April 5, 1912. Serial No. 688,774.

*To all whom it may concern:*

Be it known that I, JOHN M. FRANKLIN, a citizen of the United States, residing at Hatfield, in the county of Montgomery and State of Pennsylvania, have invented new and useful Improvements in Poultry-Feed Hoppers, of which the following is a specification.

This invention is an improved poultry feed hopper, the object of the invention being to provide a device of this character for feeding dry mash and the like feed to poultry and preventing the poultry from wasting the feed, the invention consisting in the construction, combination and arrangement of devices hereinafter described and claimed.

In the accompanying drawing:—Figure 1 is a side elevation of a poultry feed hopper constructed in accordance with my invention. Fig. 2 is a vertical sectional view of the same on the plane indicated by the line $a$—$a$ of Fig. 1. Fig. 3 is a detail plan of the top.

In the embodiment of my invention, I provide a vertical vessel or hopper 1, which is preferably cylindrical in form and the lower end 2 of which is of inverted truncated conical form, providing a contracted discharge opening 3. A feed pan 4 is arranged below the hopper and concentrically therewith and is provided with a closed bottom 6. An exterior, substantially conical base wall 7 is connected to the hopper by a series of stays 5 which, in practice, may be pieces of wire or metal strips and the ends of which are respectively soldered or otherwise suitably secured to the lower portion of the hopper and the upper portion of the base wall 7. This base wall by reason of its conical form adds greatly to the stability of the device. The feed pan is removable from the base wall thus greatly facilitating the cleaning of the feed pan. The upper end of the hopper is conical and has a pivoted or slidable cover 8. The cover is provided with a catch 9 to engage a slot in a lug 10 on one side of the hopper to lock the cover when in closed position.

On opposite sides of the hopper, near the upper end thereof, are ears 11 to which are pivotally connected the hooked ends of a U-shaped bail 12, the bail being provided with an offset centrally disposed crank portion 13 on which is a cylindrical handle 14 which is preferably made of wood. This bail adapts the device to be readily carried from place to place and also enables it to be suspended by means of a cord or the like from any suitable overhanging object so as to hold the feed hopper at a distance of about one foot above the floor when the device is employed for feeding larger chickens.

The sliding cover of the hopper enables the same to be readily supplied with feed from time to time. The contracted lower end 3 of the hopper, which is medially disposed above the feed pan, affords a space around the upper side of the feed pan through which the chickens can insert their heads to get at the feed in the pan.

It will be understood that the feed is fed by gravity from the hopper to the feed pan, and that by reason of the conical shape of the lower end of the hopper and the proximity of its opening to the bottom of the pan, flow of feed from the hopper to the pan becomes arrested before the pan becomes entirely filled and, hence, the feed is prevented from overflowing from the feed pan and, moreover, it will be understood that the chickens are prevented from getting their feet in the feed and from wasting the same.

While I have herein shown and described a preferred form of my invention, I would have it understood that changes may be made in the form, proportion and construction of the several parts without departing from the spirit of my invention and within the scope of the appended claim.

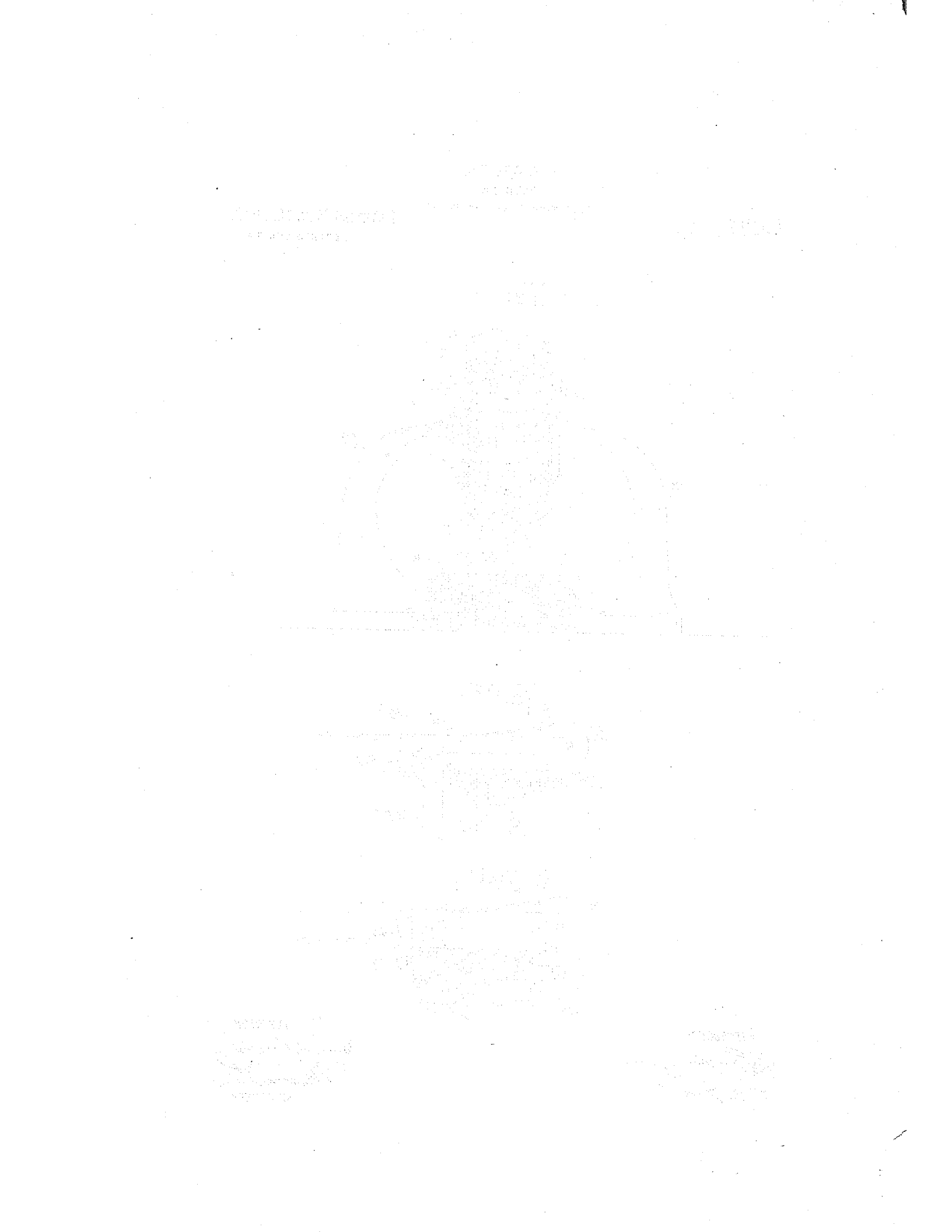

I claim:—

The herein described poultry feeder comprising a cylindrical hopper having an inverted truncated conical lower portion provided with a discharge opening at the bottom, a cylindrical feed pan below and arranged concentrically with respect to the hopper, a conical base wall extending around the feed pan, the lower side of the said base